Jan. 6, 1942.                L. W. GODDU ET AL                2,268,654
                  MEANS FOR MARKING LENSES AND SIMILAR ARTICLES
                      Filed June 20, 1939          2 Sheets-Sheet 2
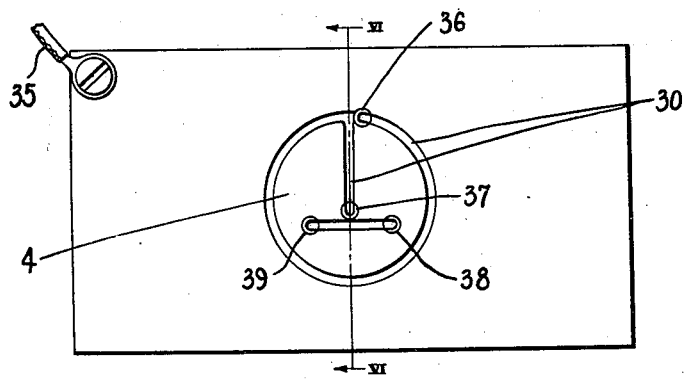
Fig. V
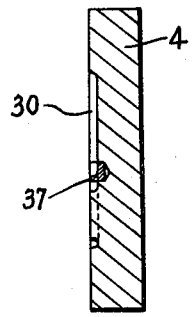
Fig. VI
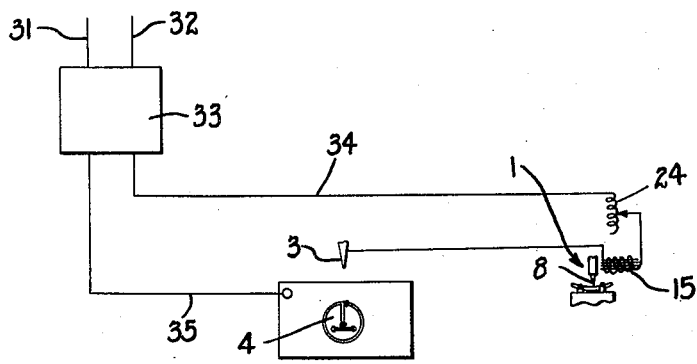
Fig. VII
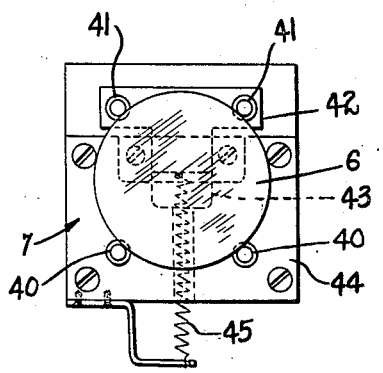
Fig. VIII
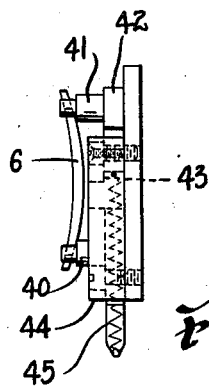
Fig. IX
INVENTOR.
LLOYD W. GODDU.
IAN C. CRAWFORD.
BY Harry H. Styll
ATTORNEY.

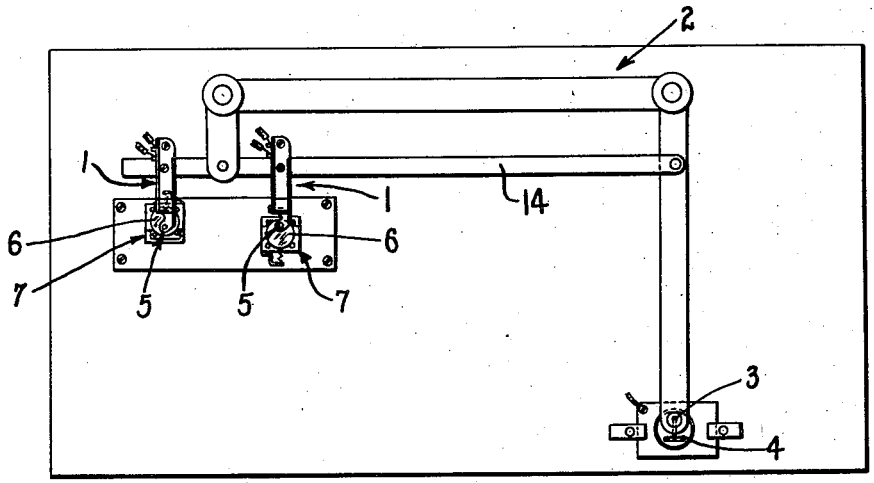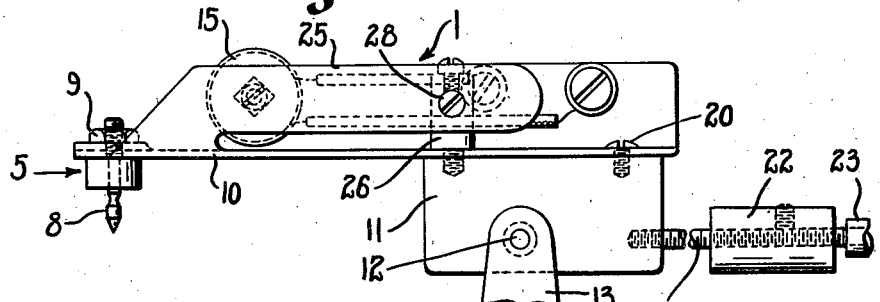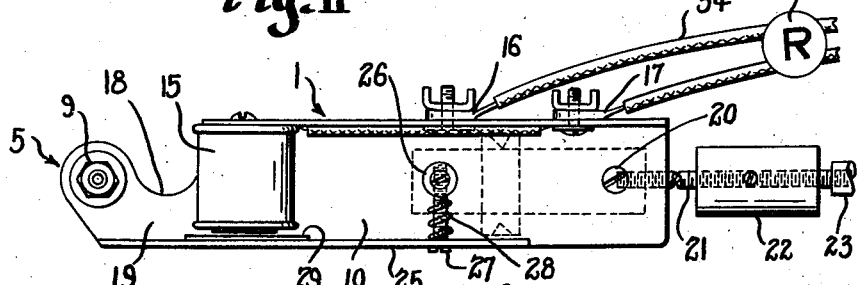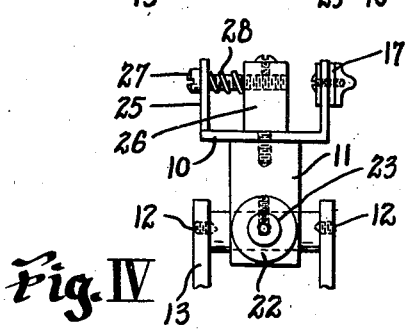

Patented Jan. 6, 1942

2,268,654

UNITED STATES PATENT OFFICE 2,268,654

MEANS FOR MARKING LENSES AND SIMILAR ARTICLES

Lloyd W. Goddu, Southbridge, and Ian C. Crawford, Belmont, Mass., assignors to American Optical Company, Southbridge, Mass., a voluntary association of Massachusetts Application June 20, 1939, Serial No. 280,144

1 Claim. (Cl. 33—25)

This invention relates to marking glass articles and more particularly lenses, lens blanks and the like, and has particular reference to improved means and methods of providing such articles with an inconspicuous mark of identification.

One of the principal objects of the invention is to provide an identification mark on glass articles, such as lenses, lens blanks or the like, having a finished optical surface thereon with the mark applied to said surface so as to be substantially invisible to an unaided eye and which will not effect the optical characteristics of the article so that the said mark may be applied to the article to permanently remain thereon and has particular reference to improved means and method of applying said mark.

Another object is to provide improved means and method of applying inconspicuous marks of identification simultaneously on a plurality of such articles.

Other objects and advantages of the invention will become apparent from the following description taken in connection with the accompanying drawings and it will be apparent that many changes may be made in the details of construction, arrangement of parts and steps of the method shown and described without departing from the spirit of the invention as expressed in the accompanying claim. The invention, therefore, is not limited to the specific details of construction, arrangement of parts and steps of the method shown and described as the preferred forms only have been given by way of illustration.

Referring to the drawings:

Fig. I is a diagrammatic plan view of the device embodying the invention;

Fig. II is a side elevation of the marking means of the device illustrated in Fig. I;

Fig. III is a top plan view of the marking means illustrated in Fig. II;

Fig. IV is a partial view in elevation, looking from the right of Fig. III;

Fig. V is a plan view of the pattern design employed in the device illustrated in Fig. I;

Fig. VI is a sectional view taken as on line VI—VI of Fig. V;

Fig. VII is a schematic view of the electrical wiring system of said device;

Fig. VIII is a plan view of the work holding means; and

Fig. IX is a side elevation of the work holding means illustrated in Fig. VIII.

There are available mechanisms and processes for abrading the surface of glassware so as to mark distinctly on the glassware a design, or indicia or the like. Such designs, however, were so formed as to be distinctly visible to an unaided eye and were in most instances for decorative purposes. The present invention distinguishes from such markings in that the abrading operation performed by the device embodying the invention is not for decorative purposes and is not conspicuously visible to an unaided eye. Its characteristics distinguish from the prior art in that the markings may be formed on a finished optical surface without being visible to an unaided eye and do not destroy the optical characteristics of the surface on which the mark is placed. Such marks, therefore, are particularly valuable as means of identification or for branding purposes where the appearance, attractiveness or even the usefulness of the glass article or lens is not injuriously affected as would be the case if the marking were sharply defined and of such character as to be readily visible to an unaided eye.

In accordance with the present invention treatment of the surface of the glass during the forming of the identification mark is so controlled that the mark is only superficially formed so that a barely distinguishable mark is obtained without injury to the article or lens either from the optical viewpoint or from the standpoint of appearance. The identification mark and means and method of making the same, according to the present invention, results from the use of an abrading tool whose contact is so restricted and controlled as to produce a fine line or spaced depressions either separately of or in addition to said line, which individually are not visible to an unaided eye, but said lines or spaced depressions are so grouped in adjacent relation with each other within a controlled path that they will be distinguishable in the presence of proper illumination but will not be readily visible to an unaided eye or when examined under improper lighting conditions.

Referring more particularly to the drawings wherein like characters of reference designate like parts throughout the several views the device embodying the invention comprises broadly a plurality of vibrating marking devices 1 supported by a suitable pantograph 2 having a tracer member 3 for following a desired pattern 4. The marking devices 1 have suitable marking means 5 adapted to form a mark simulating the mark of the pattern 4 on lenses 6 carried by suitable lens holders 7.

The pantograph arrangement shown is only by way of illustration of how a plurality of marking devices may be simultaneously controlled by a single tracing member and pattern. Although only two marking devices are shown, it is to be understood that a plurality of such devices may be under the control of a single tracer and pattern member, it being necessary, of course, to provide suitable pantograph mechanism for accommodating a greater number of marking devices.

The marking devices 1, as shown in Figs. II to IV inclusive, each comprise a diamond point 8 which is adjustably supported, by means of a clamp nut or the like 9, on an arm 10 carried by a member 11 pivotally attached at 12 to a support 13 which is adapted to be secured to the arm 14 of the pantograph.

The arm 10 has, in general, the cross-section of an angle, (see Fig. IV), an upright side of which carries an electromagnet 15. The electric contacts for supplying a current to the magnet are shown at 16 and 17 respectively. The base of the angled arm portion 10 is cut away at 18 so that the front portion of the device in which the point 8 is mounted is connected to the main portion of the base by a reduced neck 19. The rear portion of the base is secured, as by screws or the like 20, to the member 11. The member 11 which is pivotally attached at 12 is preferably solid and, therefore, relatively heavy as compared with the remainder of the device 1. The member 11, which is adapted to tilt about its pivotal connection 12, is provided with a rearwardly extending rod 21 on which is threadedly mounted a counter balancing weight 22. By adjustment of the weight away from or toward the pivot 12, the pressure of the point 8 upon the lens being marked, may be lightened or increased. A rubber cushioning member 23 surrounds the outer end of the rod 21 so as to cushion the lifting movements of the point 8.

The weight 22 provides one adjustment of the affective marking point 8. In addition, a rheostat 24 which controls the current supply to the magnet 15, so as to vary the amplitude of vibration of the point 8 as introduced by said electromagnet 15, is positioned in the electrical circuit of the marking device. A further control for the vibration of the point 8 is afforded in connection with a wing 25 which rises upwardly from the base of the arm adjacent said neck portion 19 and extends rearwardly along the device 1. The front part of the wing 25 acts as an armature for the magnet 15, and transmits vibrations set up by the magnet to the front portion of the base of the device 1, this being the portion which carries the point 8. Adjacent the rear end of the wing 25 is a post 26 terminating at its lower end as one of the screws by which the arm 10 is secured to the member 11. An adjacent screw 27 extends through the wing 25 with its head engaging the outer surface of the wing. A compression spring 28 is interposed between the post and the inner face of the wing 25. Screwing the screw 27 toward the post 26 decreases the freedom of vibration of the wing 25 and therefore the point 8, while unscrewing the screw, has the opposite effect. As it is this wing 25 which serves as the armature of the magnet 15 it is preferred to weld to the inner surface of the wing 25 opposite the magnet a thin plate of metal 29.

In the construction of pantograph illustrated, the support 13 is preferably moved by the motion transfer mechanism of the pantograph to produce the design 4 as the tracer pin 3 is moved within the confines of the design. It is to be understood, however, that a pantograph arrangement may be used whereby either the support 7 for the lens, or the support 13, or both, may be moved by any suitable pantograph motion to produce the design which is desired. It has been found that the vibration of the diamond point 8 does away with the objectionable features of marking lenses or glassware with a non-vibrating diamond point. The mark produced, in accordance with the invention, is in general lighter and therefore from said point of view less objectionable than a mark produced by a non-vibrating diamond point which has been previously used in the past. The distinctness of the mark can be varied in accordance with the adjustment made. It will be noted that there have been provided three such adjustments; namely, the counter balancing effect of the weight 22, the compression of the spring 28 by the screw 27 and the adjustment of the current supply by the rheostat 24. These features are of advantage in the marking of glassware, such as lenses, lens blanks or the like, particularly where it is desirable that the mark be unobtrusive or substantially invisible to an unaided eye. The mark might be distinguished as comprising a series of contiguous marks within a controlled band width in a guided path of movement and of a controlled depth, which individual marks are invisible to an unaided eye but when grouped in said band width results in a superficial mark which is visible to the naked eye substantially only under suitable light conditions, as by looking through the lens at some dark surface while light is shining on the lens and by tilting the lens until a position is located wherein the mark is readily visible.

The design pattern plate 4, as shown in Figs. V and VI, has grooved portions 30 of the desired configuration of the design which is to be formed on the lenses or lens blanks. The marking is accomplished by guiding the tracer member or pin 3 within the confines of the grooved configuration of the pattern plate. It is to be noted by reference to Figs. V, VI and VII, that the current supply which is coming through the lead wires 31 and 32, from any suitable source of electrical energy, through the transformer 33 into the lead wires 34 and 35, is directed to the tracer pin 3 and to the pattern plate 4 so that the circuit is energized only when the tracer pin which is preferably formed of metal, engages the pattern plate 4, also preferably formed of metal, that is, when the metal of the pin 3 comes in contact with the metal of the plate 4. The plate 4 is provided with insulation members 36, 37, 38 and 39, which provide dead points for breaking the circuit to the electromagnet 15.

When forming the identification marks on the lenses, the pin 3 is first placed in contact with the insulation member 36. At this point the circuit is deenergized so that the points 8 are not vibrating. The marking points 8 are then engaged with the surfaces of the lenses to be marked with the pressure controlled through the counterbalance weight 22, etc. The tracer pin 3 is then moved from engagement with the insulation member 36 into contact with the metal of the plate 4 within the groove 30. The instant that the contact point engages the metal of the plate 4 the circuit to the electromagnet 15 is closed and the tools 8 immediately begin to vibrate. The first movement is throughout the circular configuration of the pattern and is continuous until the point 37 is reached, whereupon the pin moves into engagement with said insulation member 37. When at this point the circuit is automatically broken and vibration of the tools 8 ceases. This is to prevent the tools 8 from cutting too deeply into the surface of the lenses being marked at the start and finish of said marking. The contact 3 is then placed in engagement with the insulation member 38 and is moved substantially continuously toward and into engagement with the insulation member 39. It being understood that the marking points 8 have been lifted from the lenses and placed in contact therewith after the tracer pin has been placed in engagement with the insulation member 38. This completes the mark. The size of the mark formed on the lens is controlled by adjustment of the marking devices I longitudinally of the arm 14 according to the size of the master pattern 4. It is to be understood that although only one pattern design is illustrated several different pattern designs, that is of different configuration, may be employed. It is also to be understood that prior to the tracing of said design on the lenses the rheostat 24 is suitably adjusted so as to control the extent of vibration of the tool 8.

The holding means 7 comprises broadly a pair of fixed contacts 40 and a pair of movable contacts 41. The contacts 41 are carried by a plate 42 slidably mounted in a suitable slideway 43 formed in the plate 44 carrying the stationary contacts 40. A suitable spring 45 constantly urges the movable contacts 41 towards the fixed contacts 40 and are adapted to engage the edge surface of the lenses 6 to be held thereby. Although a specific type of holding device has been shown or described, it is to be understood that any desirable holding device may be employed. It is also to be noted that the identification mark may be positioned in any desired location on the lens or lens blanks.

Although a diamond marker has been described, it is to be understood that any suitable type of abrasive means might be used, for example, the marking device may be a solid metallic pin point with which loose abrasives generally known in the art may be employed, or any other desirable marking means, such as sapphires or the like might be used.

The present invention, has distinct advantages in that the mark formed is broadened out rather than deepened so that while the contiguous marks individually are invisible to an unaided eye the broadening out of the lines of the pattern produced by said contiguous marks renders the mark visible under suitable conditions. The mark is contrasted from decorative marks in that such decorative marks, as have been usual in the prior art, were distinctly visible and were intended for visible decorative purposes. The mark in the present instance is carefully controlled so as to be superficial in its character and substantially invisible and of a nature which will not alter the optical characteristics of the light rays passing through either portion of the lens. The mark as seen under high powered magnification is contrasted from the deep cut marks of prior art in that it constitutes a series of adjacent slight depressions rather than a continuous line of equal depth. This, of course, would be varied according to the adjustment of the vibrating of the tool.

It is to be understood that while there has been illustrated and described the embodiment of the invention which is at present preferred it will be understood that the invention may be otherwise practiced within the scope of the following claim.

Having described our invention, we claim:

An apparatus for marking glassware comprising means for supporting said glassware, means for supporting a marking tool for movement into engagement with said glassware, means for guiding said tool and glassware in a controlled path relative to each other, said marking tool supporting means comprising in part a flexible arm having a portion responsive to magnetic force with the marking tool supported adjacent one end thereof and an electromagnet on said support so arranged as to direct its magnetic force on said portion of said arm responsive to said magnetic force so as to produce a vibratory movement of said tool in a direction transversely of the longitudinal axis of the marking tool whereby said tool will vibrate in said direction, means for controlling the extent of said vibratory movement of said tool so as to produce a controlled band width with a plurality of adjacent markings within the limits of said band width, means for electrically energizing said electromagnet for generating said vibratory movements of the tool, means on said guide means at a given point along said controlled path for deenergizing said electromagnet with said means having dimensional characteristics such that upon further movement of the tool in said controlled path said electromagnet will again be energized, said support and associated parts thereof being pivotally connected with a carrying member so as to permit movement of the marking tool into and out of engagement of glassware to be marked and weight means on said support adjustable to a position whereby the markings resulting from said vibratory movement of the tool on the glassware will be of a superficial nature.

LLOYD W. GODDU.
IAN C. CRAWFORD.